(12) United States Patent
Bosson

(10) Patent No.: US 6,863,252 B2
(45) Date of Patent: Mar. 8, 2005

(54) DISPLAY DEVICE SUPPORT SYSTEM

(76) Inventor: Peter Thomas Bosson, 68 Greenland Quay, Rotherhithe, London SE16 1RR (GB)

( * ) Notice: Subject to any disclaimer, the term of this patent is extended or adjusted under 35 U.S.C. 154(b) by 304 days.

(21) Appl. No.: 09/820,529

(22) Filed: Mar. 29, 2001

(65) Prior Publication Data

US 2002/0011544 A1 Jan. 31, 2002

(30) Foreign Application Priority Data

Mar. 30, 2000 (GB) .............................................. 0007806

(51) Int. Cl.$^7$ ............................................... E04G 3/00
(52) U.S. Cl. ..................................... 248/278.1; 248/131
(58) Field of Search ........................... 248/125.7, 125.4, 248/131, 144, 145, 282.1, 122.1, 278.1, 917–921; 362/11, 33

(56) References Cited

U.S. PATENT DOCUMENTS

| | | | | |
|---|---|---|---|---|
| 2,871,030 A | * | 1/1959 | Hollis | 280/492 |
| 3,240,925 A | * | 3/1966 | Paschke et al. | 362/33 |
| 3,913,880 A | | 10/1975 | Lucasey et al. | |
| 4,517,632 A | * | 5/1985 | Roos | 362/389 |
| 4,528,597 A | | 7/1985 | Klein et al. | |
| 4,585,196 A | | 4/1986 | Cormier | |
| 4,711,461 A | * | 12/1987 | Fromberg | 280/494 |
| 4,726,552 A | * | 2/1988 | Warshawsky | 248/122.1 |
| 4,733,618 A | * | 3/1988 | Sarro et al. | 108/140 |
| 5,379,205 A | * | 1/1995 | Peng | 362/430 |
| 5,400,991 A | | 3/1995 | Werner | |
| 5,429,336 A | * | 7/1995 | Ko | 248/278.1 |
| 5,521,957 A | * | 5/1996 | Hansen | 378/198 |
| 5,647,604 A | * | 7/1997 | Russell | 280/492 |
| 5,683,064 A | * | 11/1997 | Copeland et al. | 248/278.1 |
| 5,687,939 A | | 11/1997 | Moscovitch | |
| 5,794,908 A | * | 8/1998 | East et al. | 274/503.1 |
| 5,797,568 A | | 8/1998 | Gongora et al. | |
| 5,901,200 A | * | 5/1999 | Krause | 378/198 |
| 5,918,841 A | | 7/1999 | Sweere et al. | |
| 5,944,896 A | * | 8/1999 | Landesman et al. | 118/500 |
| 6,086,034 A | * | 7/2000 | McAllister et al. | 248/278.1 |
| 6,343,006 B1 | | 1/2002 | Moscovitch et al. | |
| 6,471,363 B1 | * | 10/2002 | Howell et al. | 362/11 |
| 6,554,238 B1 | * | 4/2003 | Hibberd | 248/278.1 |

FOREIGN PATENT DOCUMENTS

| | | |
|---|---|---|
| DE | 295 04 362 | 5/1995 |
| DE | 19638388 | 4/1998 |
| EP | 0105076 | 4/1984 |
| EP | 0795716 | 9/1997 |
| FR | 1123172 | 9/1956 |
| FR | 1406564 | 7/1965 |
| JP | 110151124 | 6/1999 |
| WO | 00/39493 | 7/2000 |
| WO | 01/35796 | 5/2001 |

OTHER PUBLICATIONS

Patent abstracts of Japan vol. 1997, No. 3, Mar. 31, 1997 and JP 08 312 885, Nov. 26, 1996.

* cited by examiner

Primary Examiner—Leslie A. Braun
Assistant Examiner—Tan Le
(74) Attorney, Agent, or Firm—Dilworth & Barrese LLP.

(57) ABSTRACT

A display monitor support system comprising a vertical post (3) on which an arm (2) is pivotally mounted. The vertical position of the arm (2) relative to the post (3) can be adjusted by fitting an O-ring into one of several annular recesses (12) provided along the length of the post (3), the arm resting on the O-ring and being supported thereby. The arm (2) is preferably in two sections (2A,2B) pivotally connected by pin (6). A universal joint (5) is provided at the end of the arm (2) to which a quick-release mechanism (4) is attached, said mechanism including a mounting plate (98) connected to the monitor (1).

25 Claims, 10 Drawing Sheets

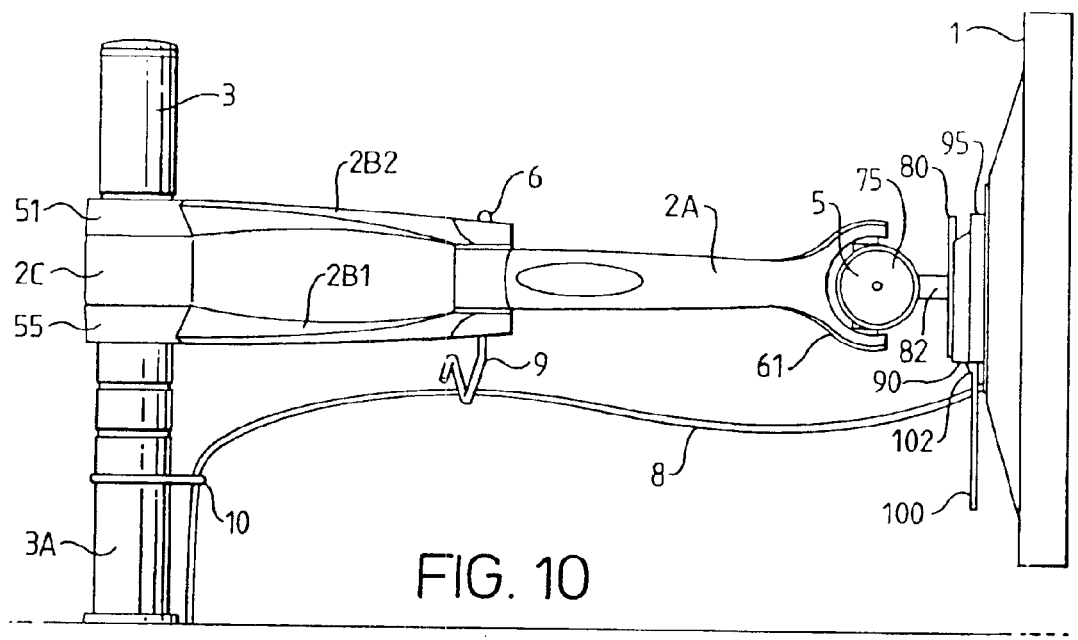
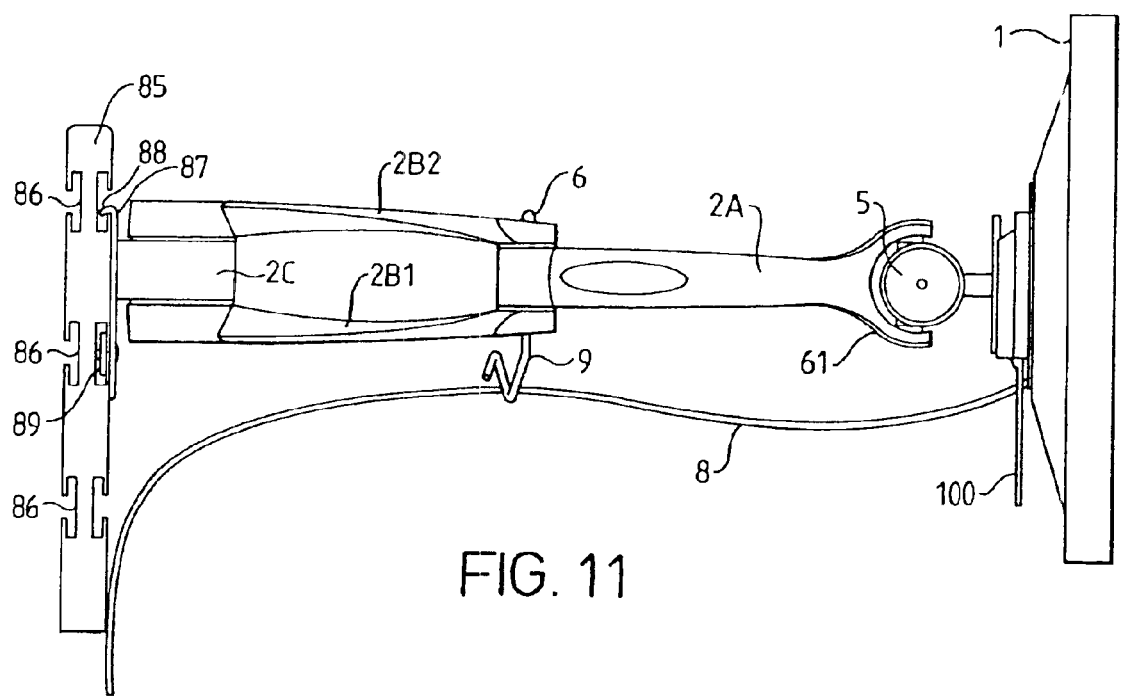

DISPLAY DEVICE SUPPORT SYSTEM

This invention relates to a support system for display devices such as display monitors which are used in financial trading rooms.

Financial traders are surrounded at their work station or desk by display monitors which give them the information that they need about share or other prices to enable them to trade and deal. Speed is of the essence in their job so it can be disastrous if one of the monitors develops a fault and goes down. The quickest way to deal with the problem is to replace it immediately rather than try to repair it. However, the monitors are commonly mounted in purpose built fixtures or on supports which do not make it easy for them to be removed and replaced.

SUMMARY OF THE INVENTION

It is therefore an object of the invention to provide a display device support system including means which facilitate the easy replacement of a display device thereon and also to provide a system which is versatile and can be assembled to suit the particular needs of the person using the display devices.

According to the invention, there is provided a support for an electrical display device such as a monitor comprising mounting means configured to suspend the display device therefrom, said mounting means including a quick release mechanism to allow the display device to be readily and quickly detached from the support.

Preferably the display device is a display monitor and support is an arm having mounting means at its end remote from the quick-release mechanism for attaching it to a wall or support post.

In the preferred embodiment, the mounting means includes a pivot joint which allows the arm to move from side to side in a horizontal plane.

In one embodiment, the mounting means can take the form of a collar or sleeve which fits over and around a support post. In an alternative embodiment, the mounting means includes attachment means arranged to engage with a wall or vertical surface to attach the arm thereto. The wall can be a plane surface or it can have a plurality of horizontally extending spaced parallel channels therein (SLATWALL) in which case the attachment means can include a lip which engages with one of said channels to attach the arm to said wall and securing means which engage with a channel located above or below that engaged by the lip to secure the monitor on the wall.

The arm can be in two parts which are connected together by a pivot joint which allows each arm part to move from side to side in a horizontal plane. In the preferred embodiment, the mounting means is connected to a universal joint provided at said one end of the support.

The quick-release mechanism preferably comprises a male attachment member which protrudes from the rear of the monitor mounting means, said attachment member having a head which is received in a rebated slot provided in a female attachment member attachable to the support.

Preferably the quick-release mechanism includes locking means biased to engage when the head of the male attachment member is fully seated in the rebated slot in the female attachment member. Conveniently an actuator extends from the locking means for manual operation by a user to release said locking means. Conveniently the actuator is a lever which extends beyond the periphery of a monitor when mounted on the support.

Preferably mounting means is a tubular collar open at both ends, the collar fitting over and around a support post and being of a constant internal diameter along most of its length but increasing in diameter at one end to provide an internal chamfered edge around said one end.

In the preferred embodiment, the support is mounted on an upright post or pillar which has a plurality of parallel annular rebates spaced along its length to receive a resilient O-ring therein. The post can be formed in one piece or can comprise a plurality of individual segments which inter-fit with each other.

Several preferred embodiments of the invention will now be described, by way of example only, with reference to the accompanying drawings, in which:

BRIEF DESCRIPTION OF THE DRAWINGS

FIG. 10 is a side view of one configuration of the support of the present invention mounted on a vertical post;

FIG. 11 is a side view of the support in the configuration shown in FIG. 10 but mounted on a slat wall;

DESCRIPTION OF THE PREFERRED EMBODIMENTS

Figure 1:
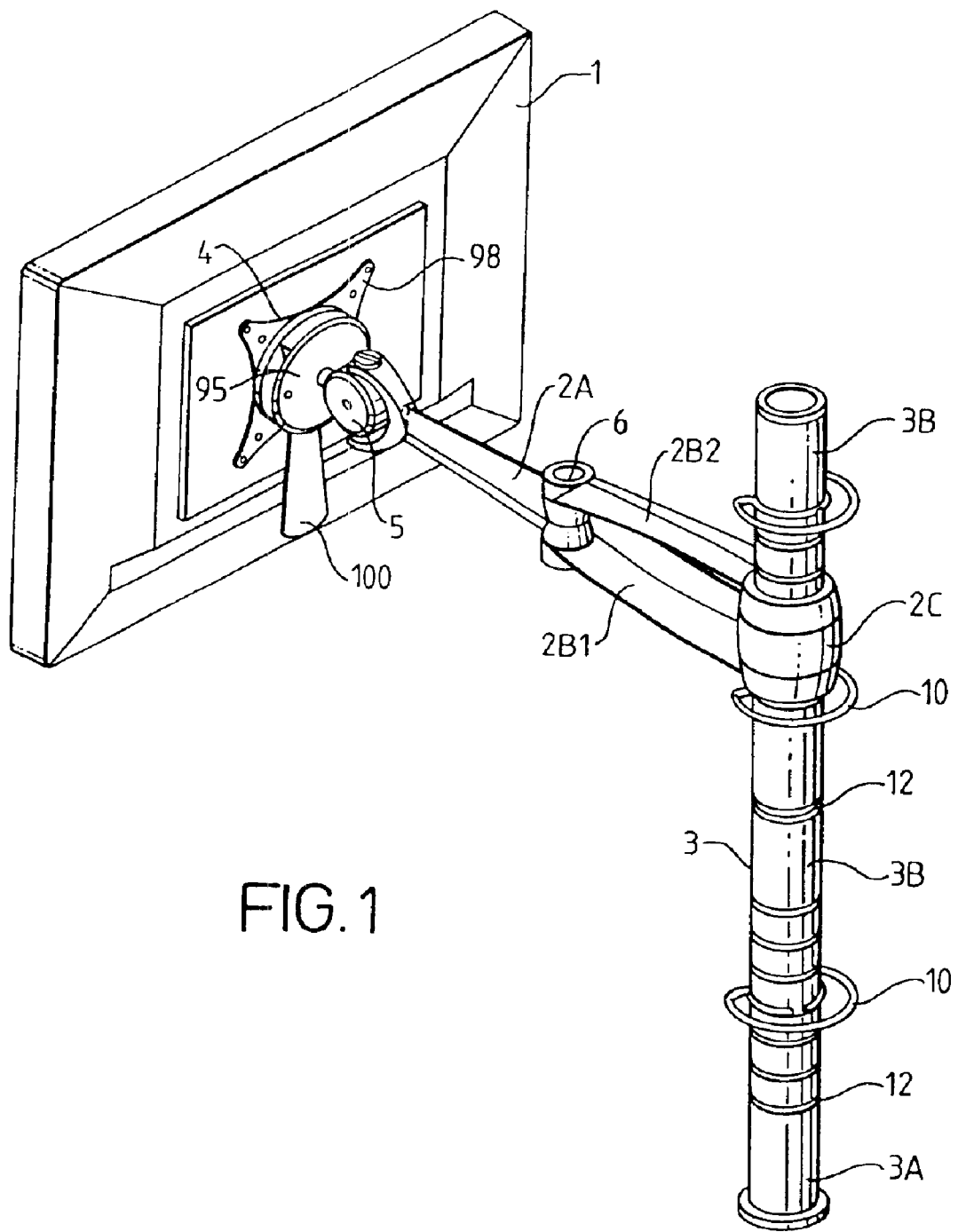
FIG. 1 is a perspective view of a flat screen display monitor mounted on a support system of the present invention.
Figure 2:
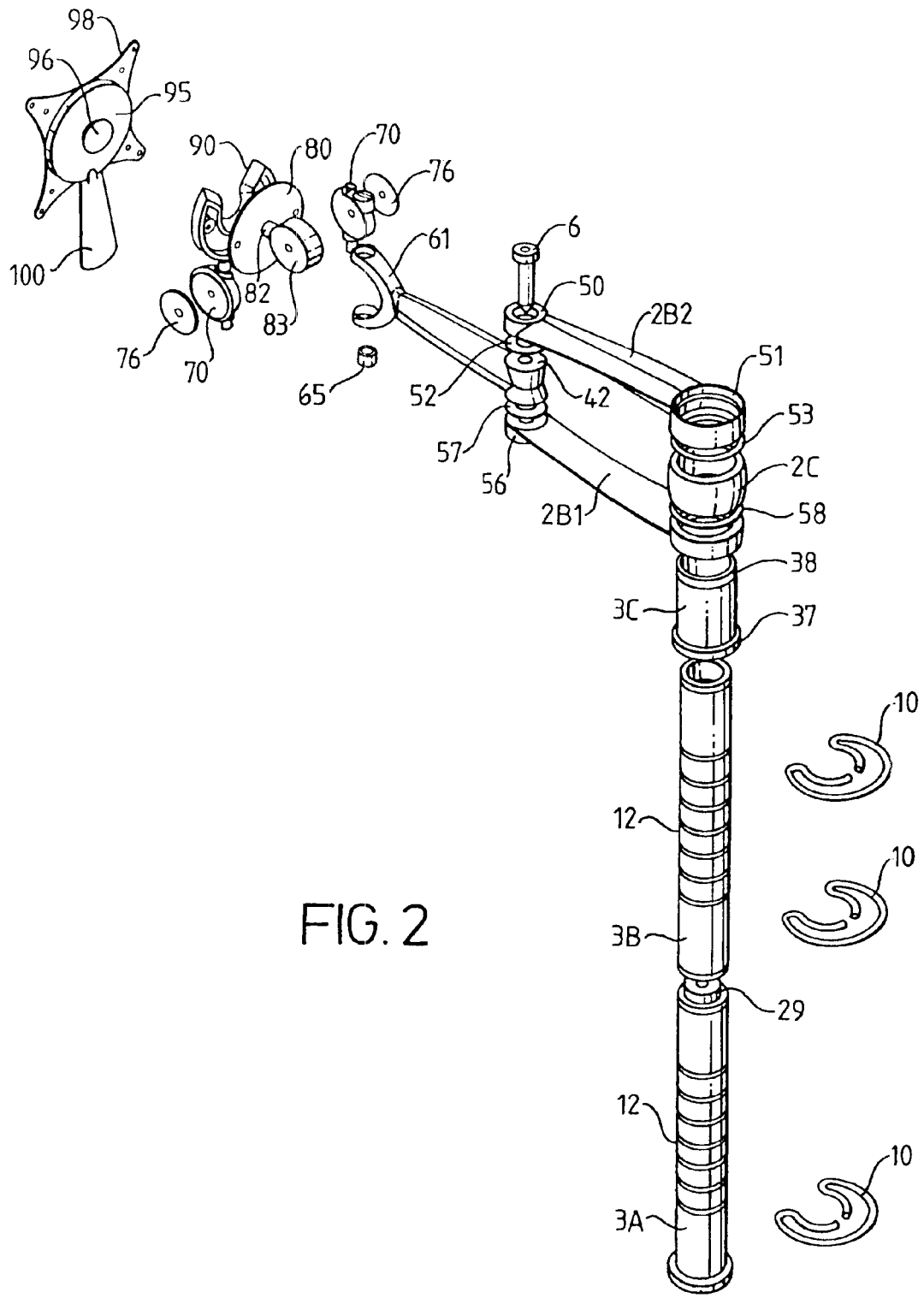
FIG. 2 is an exploded view of the support system shown in FIG. 1 but with the flat screen monitor omitted.

Referring first to FIGS. 1 and 2, there is shown a flat screen monitor 1 attached to a support in the form of an arm 2 mounted on a vertical post 3. The arm 2 comprises a section 2A connected to another section 2B by a vertical pivot pin 6. The arm section 2B comprises a lower part 2B1 and an upper part 2B2.

A universal joint 5 (to be described in more detail hereafter) is provided at the remote end of the arm 2 and is connected to quick-release mechanism 4 attached to the flat screen monitor 1.

The construction of the support post 3 will now be described in more detail with reference to FIGS. 8 and 9. FIG. 8B shows the bottom post section 3A and it can be seen that it comprises a hollow cylindrical tube 11 having a plurality of annular recesses 12 formed in its outer surface, the recesses being spaced along the length of the tube 11 and being parallel to each other. A bottom plug 13 having an outwardly extending radial flange 15 at one end thereof is fitted into the bottom of the tube 11. The plug 13 has a threaded central hole 14 and a cavity 16 formed therein. When in position in the tube 11, end 22 of the tube seats against the annular flange 15 as illustrated. A top plug 17 with a threaded central hole 18 therein is fitted into the other end of the tube 11 with laterally extending lip 20 seated against top rim 21 of the tube 11. The plugs 13 and 17 are connected together by threaded rod 23 and the top plug 17 is fitted into the top end of the tube 11 by rotating it around the threaded shaft 23 until the lip 20 seats against the upper edge 21 of the tube 11.

Figure 8A:
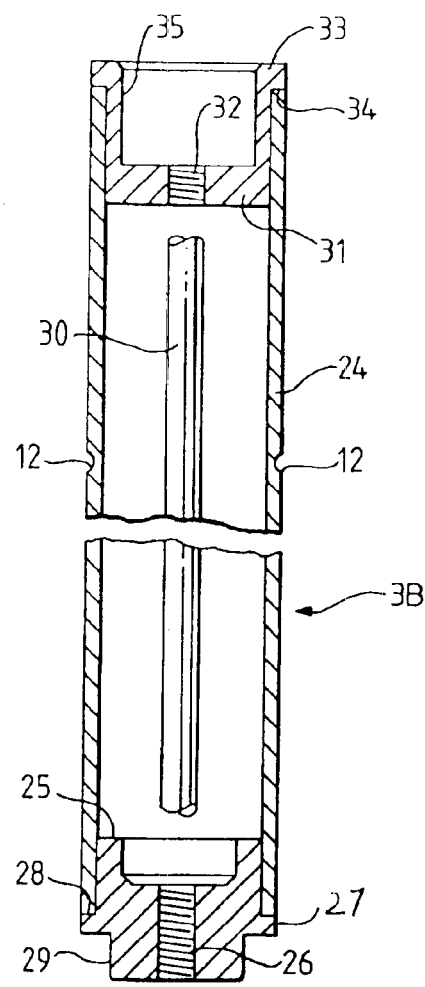
FIGS. 8A and 8B are cross sections through segments of the vertical post shown in FIGS. 1 and 2.
Figure 8B:
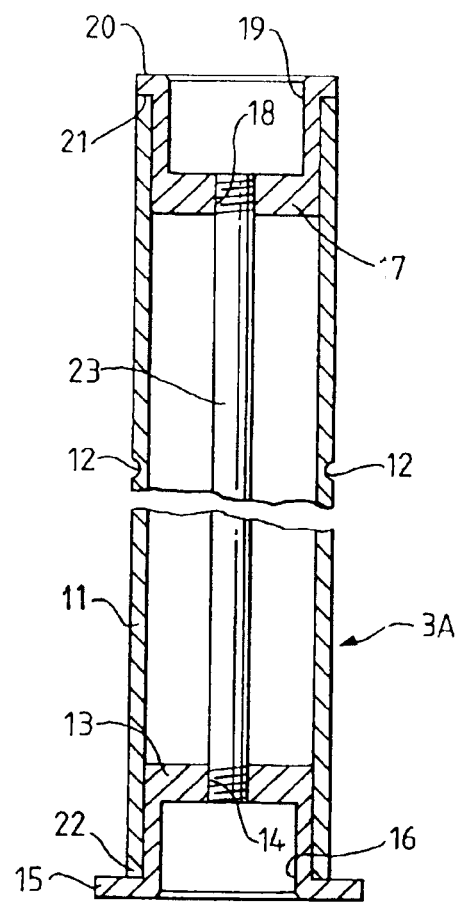

Intermediate post section 3B is shown in FIG. 8A and this comprises a hollow cylindrical tube 24 having annular recesses 12 formed in its outer surface. The recesses 12 are parallel to each other and axially spaced along the length of the tube 24. A lower plug 25 having a threaded central hole 26 in it is fitted in the bottom of the tube 24 so that laterally extending annular lip 27 engages rim 28 of the bottom of the tube 24. The plug 25 also has a section 29 of reduced diameter which protrudes from the end thereof. This portion 29 can be fitted in the cavity 19 in the upper plug 17 of the lower post member 3A to connect the post sections 3A and 3B together. An upper plug 35 having a central threaded hole 32 is fitted into the upper end of the tube 24 so that annular lip 33 thereon seats against upper rim 34 of the tube 24. A threaded rod 30 engages the threaded apertures 26 and 32 to connect the upper and lower plugs 25 and 35 together. The upper plug 35 is fitted in the tube 12 by rotating it about the stud 30 until the lip 33 thereon seats against the upper rim 34 of the tube 12.

Instead of retaining the end plugs 12 and 17 and 25 and 35 in their respective tubes 12 and 24 using the rods 23 or 30, these rods can be omitted and grub screws used (not shown) which screw into the plugs from the exterior of the tube in known manner.

Figure 9A:
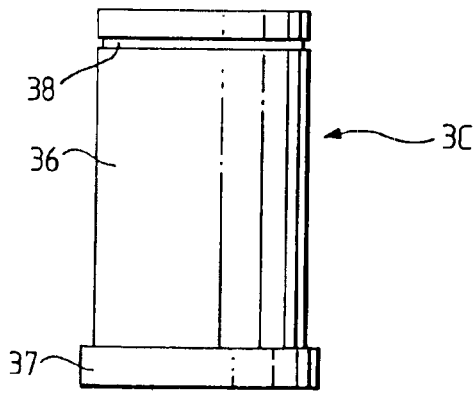
FIGS. 9A and 9B are a side view and cross section of a bush member for use with the vertical post shown in FIGS. 1 and 2.
Figure 9B:
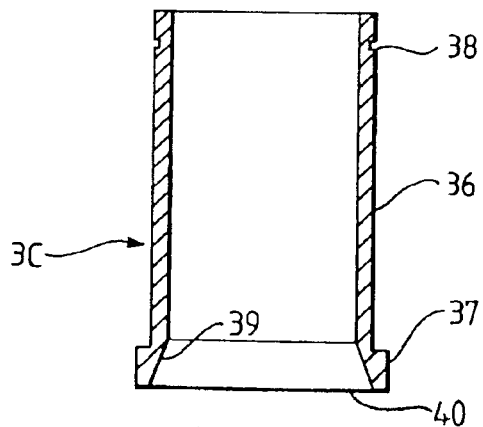

FIGS. 9A and 9B show a bush member 36 slidable along the length of the post sections 3A and 3B. The bush member 36 has a tubular body 36 with an annular rebate 38 adjacent its upper end and a collar 37 around its lower end. The inside surface of the collar 37 is chamfered around the end region 40 of the lower end of the body section 36 for reasons to be explained shortly.

In use, the bush member 3C is fitted over the post sections 3A and 3B and is slidable therealong, the inside diameter of the body section 36 of the bush member 3C being substantially equal to the outside diameter of the post sections 3A and 3B. In order to fix the position of the bush member 3C in relation to the post 3, a resilient O-ring is fitted over the post sections 3A and 3B and fitted into one of the annular recesses 12 therein. The bush member 3C is then slid along the length of the post section 3A or 3B until the chamfered surface 39 seats on the O-ring thereby fixing the position of the bush member 3C relative to the post 3.

The construction of the support arm 2 which fits onto the support post 3 will now be described in detail with reference to FIGS. 2–6. The arm 2 is made up in two sections namely section 2A and sections 2B1 and 2B2. As can be seen more clearly in FIG. 2, upper arm section 2B2 has a ring 50 formed at one end thereof and a larger ring 51 formed at its other end. The internal diameter of the ring 51 is substantially equal to the outside diameter of the bush member 3C. The lower arm part 2B1 is identical in construction to the upper part 2B2 and therefore has a ring 56 at one end and a larger ring 55 at its other end. A tubular spacer 2C is fitted between the upper and lower arms 2B1 and 2B2 and has an internal diameter substantially equal to the outside diameter of the bush member 3C. An annular spacer 53 is located between the ring 51 and the tubular spacer 2C and an annular spacer 58 is located between the tubular spacer 2C and the ring 55 of the lower arm 2B1. The bush member 3C is fitted through the upper and lower arm ends 51 and 55 and the spacer 2C to attach the arm parts thereto and the bush member 3C is held in position by circlip 41 which engages in annular recess 38 in the bush member 3C (see FIG. 4). Once in position, the arm sections 2B1 and 2B2 can rotate about the bush member 3C and thus are able to move from side to side in a horizontal plane.

Arm section 2A has a through-bore 42 formed in one end thereof and a Y-shaped yoke section 61 at its other end. To attach the arm section 2A to the arm sections 2B1 and 2B2, it is inserted between the ends 50 and 56 thereof with annular washers 52 and 57 interposed between said ring ends and the arm section 2A. Bolt 6 is then passed through the ends 50 and 56, washers 52 and 57 and through the through-bore 42 thereby pivotally attaching the arm 2A to the arm sections 2B1 and 2B2 so that it can rotate in a horizontal plane from side to side about bolt 6.

Yoke section 61 at the end of arm part 2A has bores 62 and 63 therein which receive cups 64 and 65 whose purpose will be explained shortly.

Figure 3:
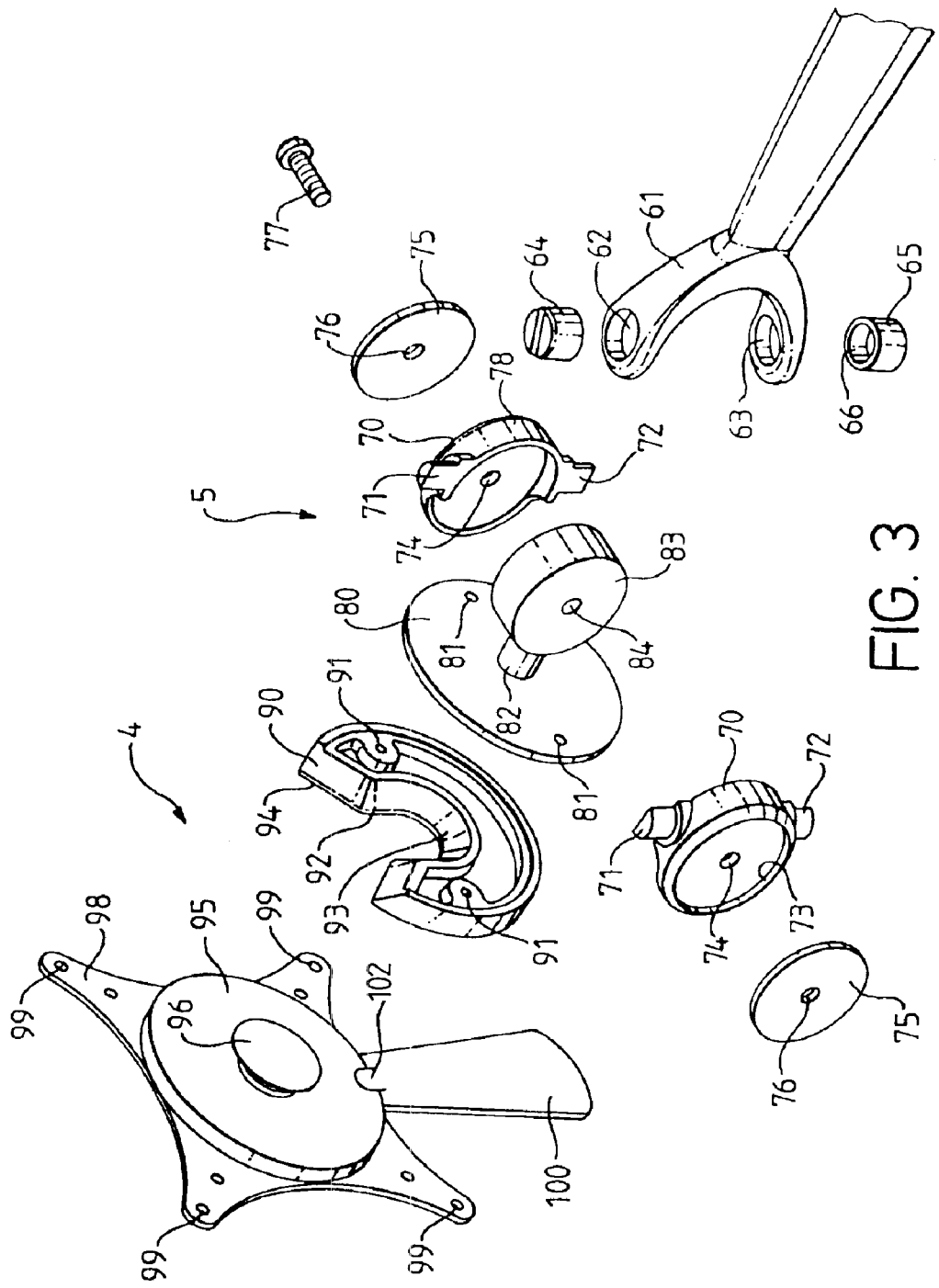
FIG. 3 is an enlarged exploded view of the quick-release mechanism and universal joint at the end of the support system shown in FIGS. 1 and 2.
Figure 4:
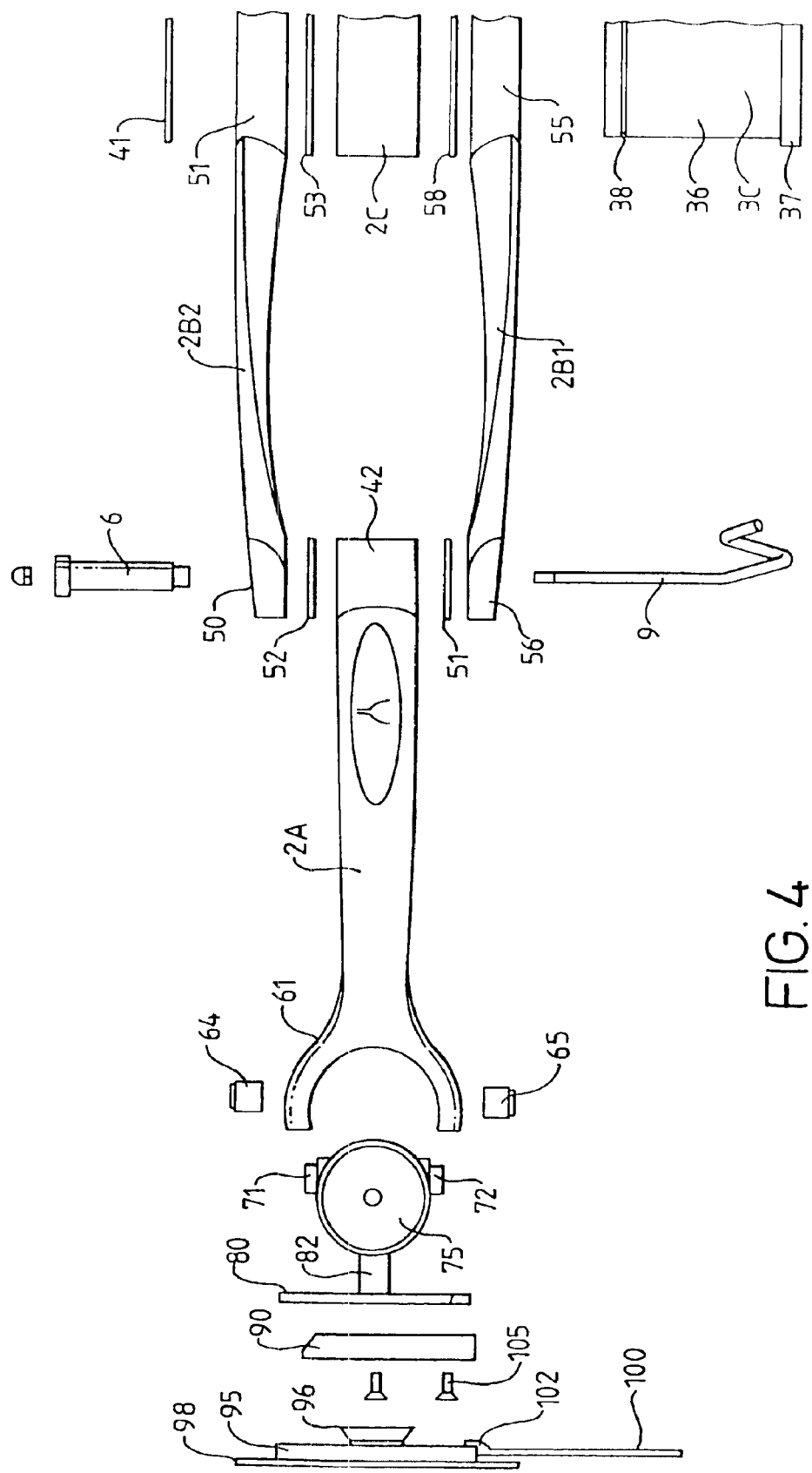
FIG. 4 is an exploded side view of the support system shown in FIGS. 1–3.

The construction of the universal joint 5 and quick-release mechanism 4 is better illustrated in FIG. 3 and will now be described in more detail. The universal joint comprises a mounting plate 80 having threaded holes 81 therein. A spigot 82 extends from the middle of said plate and has an enlarged disc shaped head 83 thereon with a central hole 84 extending through it at right angles to the axis of the spigot 82. Shell halves 70 fit on either side of the head 83 to enclose it and each has an annular wall 78 with upper and lower pivot pin halves 71 and 72 extending therefrom. It will be noted that the peripheral wall 78 only extends halfway round the circumference of the cup for reasons which will be explained later. A central hole 74 is provided in the body of the cup. The outside of the cup has a recess 73 formed therein to receive a disc 75 with a central aperture 76 therein. When the universal joint is assembled, the two cup halves 70 fit closely around the pivot head 83 and bolt 77 extends through the holes 76, 74, 84 to secure the whole assembly together. When assembled, the plate 80 can pivot up and down about the axis of the bolt 77 through an angular range of 110° dictated by the cut-out in the wall 78 of each shell half 70. The two pivot pin halves 71,72 form a complete pin when the cup halves 70 are in tight engagement around the pivot head 83 and the upper pivot pin 71 is inserted in the bore 62 and the lower pin 72 is inserted in the bore 63 at the end of the arm 2A. Once in position, they are secured in the bores 62,63 by means of the hollow cups 64 and 65 whose hollow interior 66 accommodates the ends of the pins 71 and 72. The plate 80 can now pivot about the pins 71 and 72 and move horizontally from side to side relative to the arm 2A to provide a universal joint.

Figure 5A:
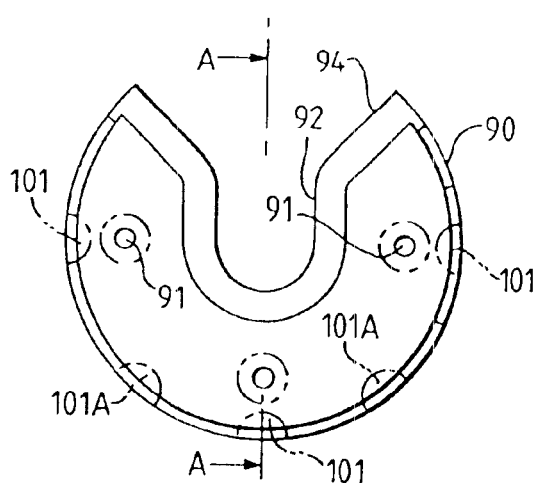
FIGS. 5A–5D are front and rear views of parts of the quick-release mechanism.
Figure 5B:
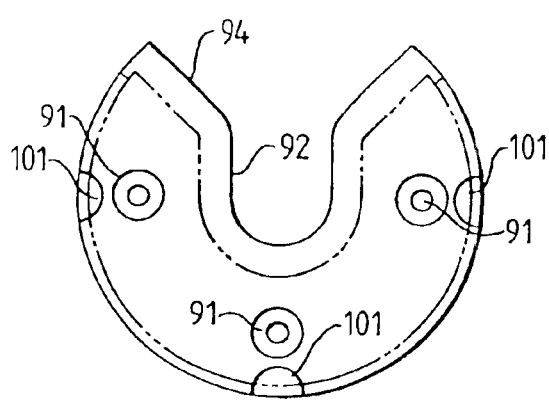
Figure 5C:
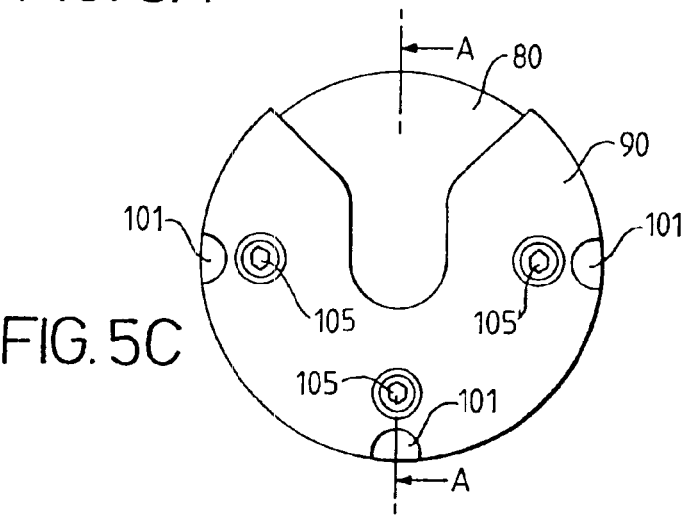
Figure 5D:
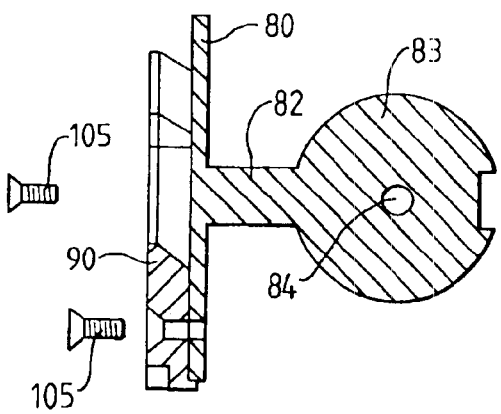
Figure 6:
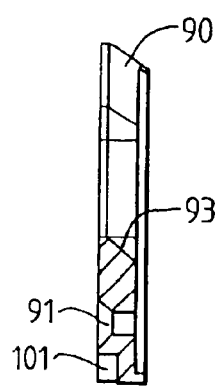
FIG. 6 is a cross section of a part of the quick-release mechanism shown in FIG. 5A.
Figure 7C:
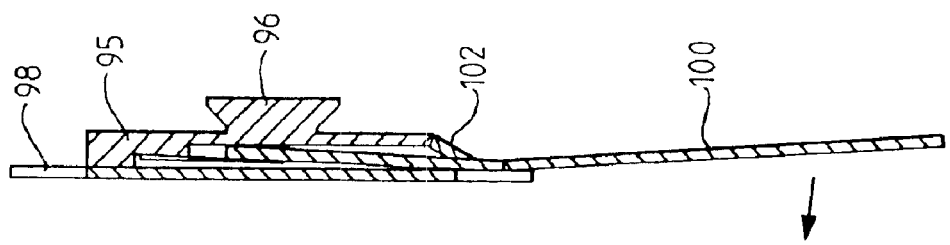
FIGS. 7A–7C are views of another part of the quick-release mechanism.
Figure 7B:
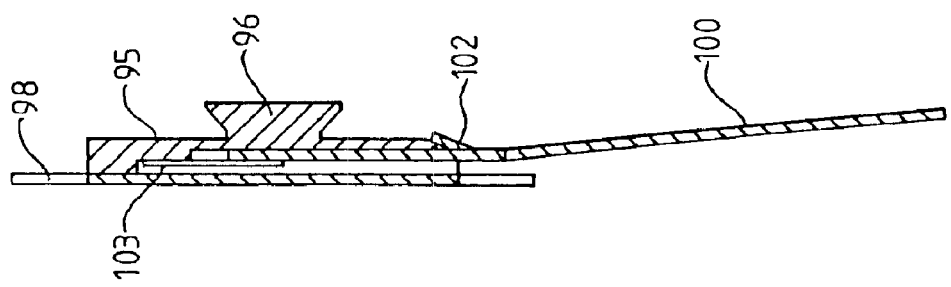
Figure 7A:
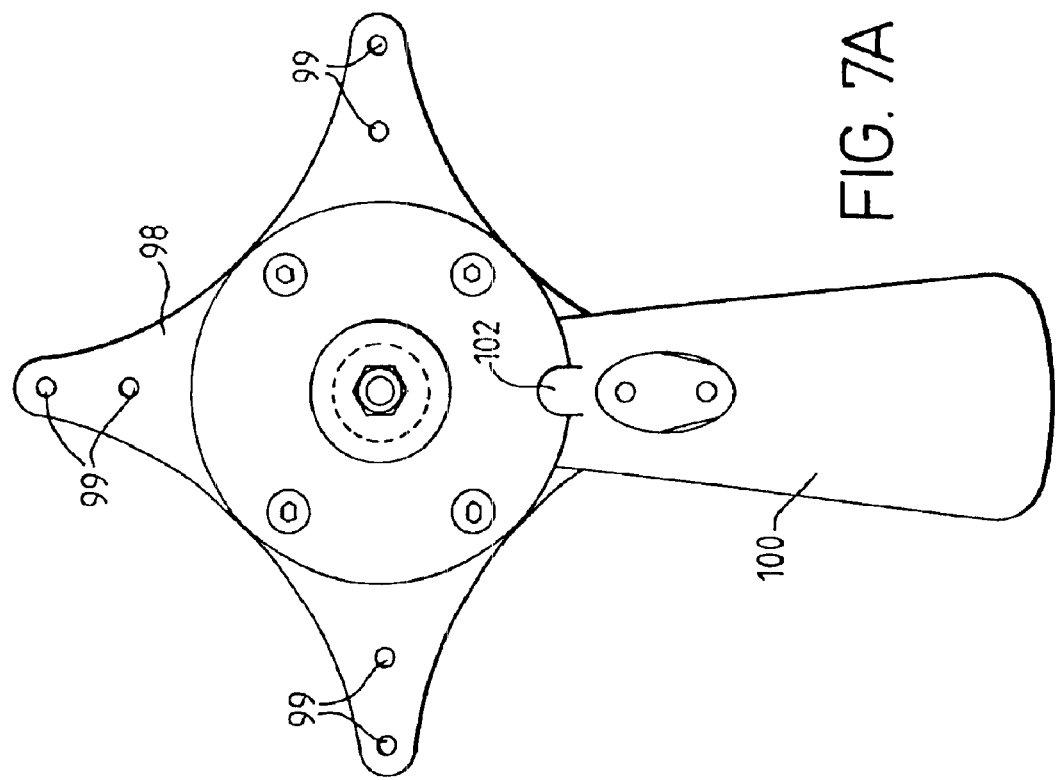

The quick-release mechanism 4 is shown in FIGS. 5–7 and comprises U-shaped quick-release female member 90 having holes 91 through which self tapping screws 105 attach the female member 90 to the plate 80 of the universal joint 5, the self tapping screws 105 being received in threaded holes 81 in the plate 80. The female member 90 has a slot 92 formed in it which has parallel sides but a widened mouth 94. An undercut or recess 93 is formed behind the mouth 94 and the slot 92. Three semi-circular cut outs 101 are provided on the front face of the member 90 as illustrated at 90°, 180° and 270° around the circumference thereof for reasons which will be explained shortly.

A plate 98 with a limb at each corner with holes 99 therein (see FIG. 7) is secured to attachment head 95 which has an inverted truncated cone 96 attached to it. A lever 100 which is biased by leaf or plate spring 103 protrudes from the bottom of the attachment head 95 and has an upstanding tang 102 deformed out of the plane of the lever which is biased to protrude above surface 97 of the attachment head 95 (see FIG. 7B). This tang 102 can be withdrawn below the surface 97 when the lever 100 is pulled in a direction towards the plate 98.

To attach the display monitor 1 to the plate 98, screws (not shown) are inserted through holes 99. The attachment head 96 is then inserted into the slot 92 in the member 90 secured to the plate 80 of the universal joint and seats therein in the recess 93. When it drops fully into position, the tang 102 locates in the centre detent 101 at the bottom of the member 90 so that the head cannot be removed from the slot 92 and it is fixed in an upright position. However, if the monitor 1 needs to be removed from the arm 2, application of pressure by a user to the lever 100 in a direction towards the monitor 1 results in the tang 102 moving in a direction towards the plate 98 so it comes out of engagement with the detent 101 and the monitor can then be lifted out of the slot 92. It will be appreciated therefore that a very simple and easy to use quick-release mechanism is provided. The monitor can also be rotated relative to the arm and locked in position relative thereto by releasing the tang 102 from the bottom detent 101 and rotating it until it locates in one of the other detents 101 at 90° thereto (see FIG. 5C). Instead of providing the three detents 101 as illustrated in FIG. 5C, two detents 101A can be used (see FIG. 5A) which are circumferentially spaced from each other to provide a 90° range of rotation between them.

FIGS. 10–13 show various ways in which the support arm 2 and vertical post 3 of the present invention can be used. In the arrangement shown in FIG. 10, the arm sections 2B1 and 2B2 pivot in a horizontal plane about the post 3, the arm section 2A pivots in a horizontal plane about the pin 60 and the monitor 1 can pivot from side to side and up and down through a 110° range by means of the universal joint 5. To detach the monitor 1, the user simply pulls the lever 100 towards the monitor 1 thereby releasing the dimple 102 from its detent 101 in the mounting member 90 and allowing the monitor to be lifted out of the slot 92 in member 90 for replacement.

FIG. 11 shows an arrangement identical to that shown in FIG. 10 except that the arm sections 2B are attached to a slat-wall 85 having horizontal parallel recesses 86 therein. The collar 2C is of a slightly different design to that shown in FIG. 10 as it no longer needs to fit over the post 3. Instead its rear face is attached to mounting plate 87 having a lip 88 which engages with the edge of a recess 86. The bottom of the plate 87 has means 89 as illustrated for securing it to its contiguous recess 86. The arm sections 2B are mounted in the collar 2C so as to be pivotable laterally in a horizontal plane relative thereto.

Figure 12:
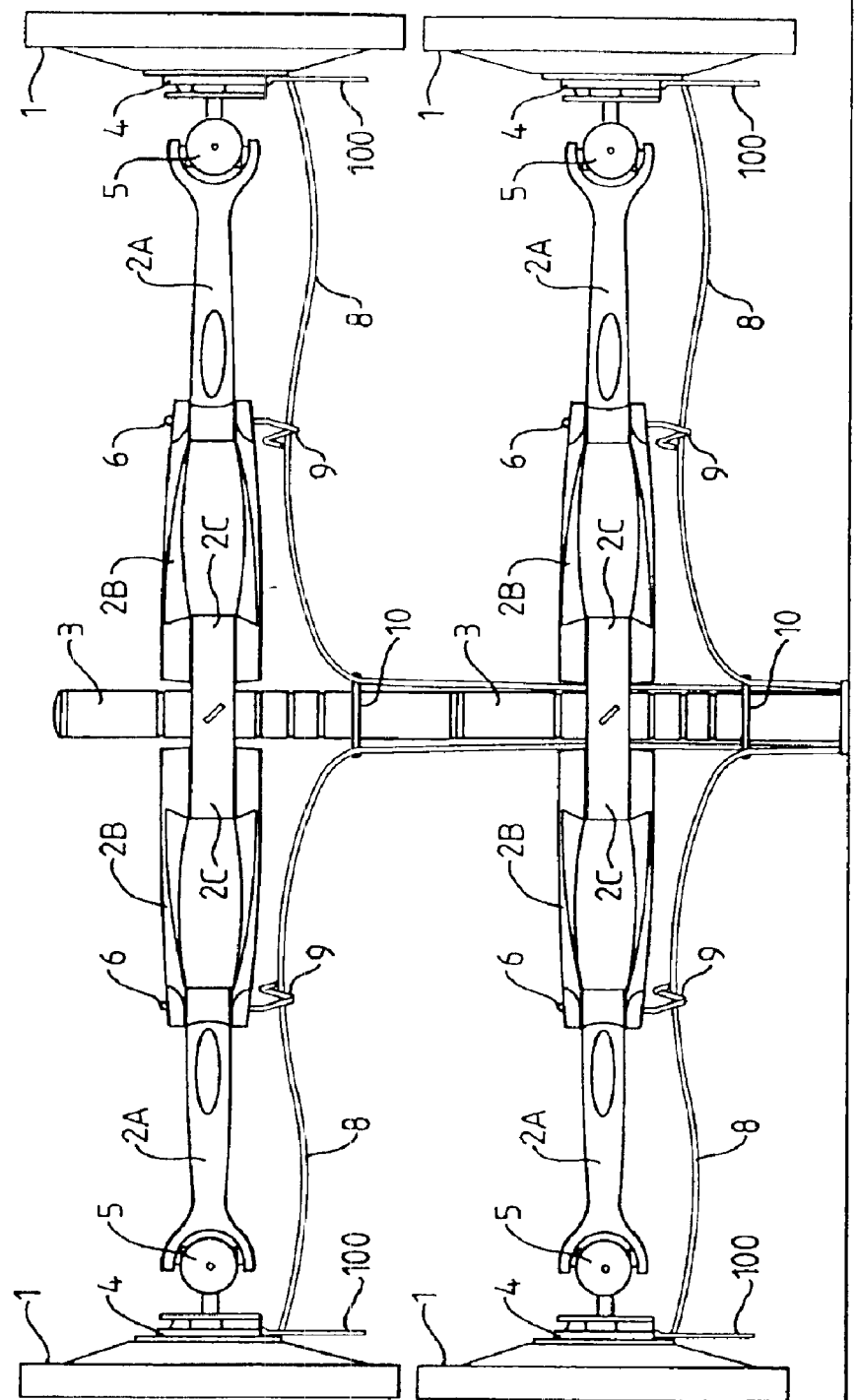
FIG. 12 shows an alternative configuration for mounting flat screen monitors on each side of a vertical post one above the other.

FIG. 12 shows an arrangement in which two monitors 1 are mounted one above the other on each side of the central post 3. In the illustrated arrangement, the upper arms 2B are pivotable relative to the common connector 2C whereas in the lower arrangement they are not.

Figure 13:
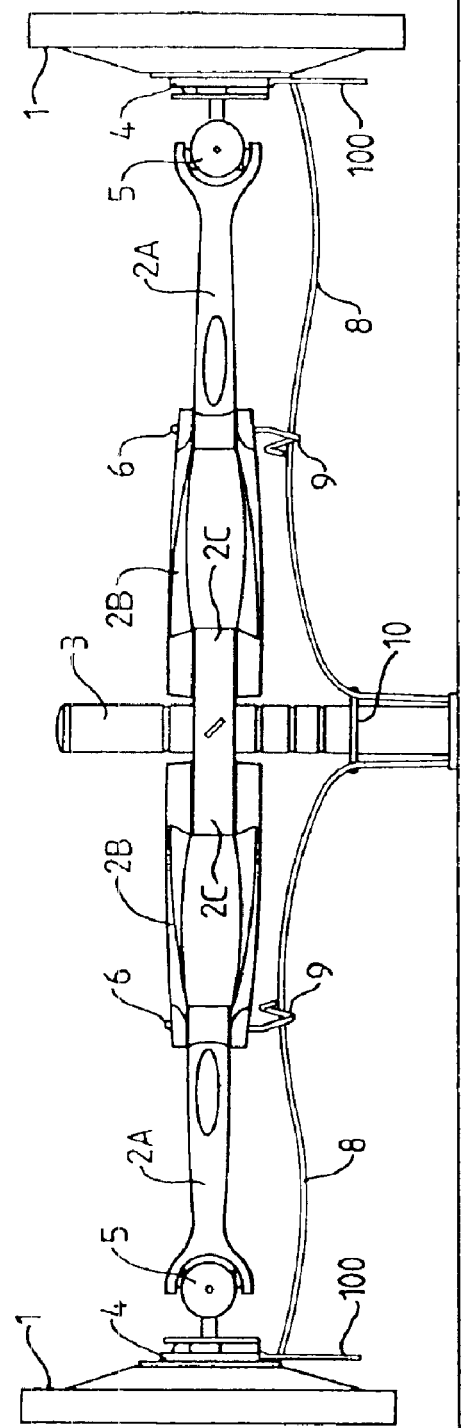
FIG. 13 shows a still further alternative configuration.

FIG. 13 shows an arrangement similar to that shown in FIG. 12 except that only a single monitor is mounted on either side of the central column 3, the upper arm sections 2B being pivotable relative to the common mounting member 2C.

It will be appreciated from the foregoing description of the preferred embodiments of the invention that it is very easy to remove and replace a display monitor 1 using the quick-release mechanism 4 with its release lever 100. The position of the monitor 1 relative to the support post 3 can also be readily adjusted due to the double articulation of the arm 2. The monitor 1 can also be pivotally moved upwardly or downwardly through a 110° range of movement thereby providing complete versatility to the assembly.

To adjust the vertical position of the arm 2 relative to the post 3, a user simply needs to lift the arm 2 upwardly to disengage the collar 2C from the O-ring and the O-ring can then be moved up or down the post 3 into another location in a suitable groove 11 or 12 and the collar 2C can be lowered into engagement with it again. It will be appreciated that this mechanism allows extremely easy alterations to be made to the vertical position of the monitor relative to the post.

What is claimed is:

1. A support for an electrical display device, comprising
mounting means configured to suspend the display device therefrom,
said mounting means including a quick release mechanism to allow the display device to be readily and quickly detached from the support, wherein
the quick release mechanism comprises a male attachment member which protrudes from the rear of the mounting means,
said male attachment member having a head which is received in a rebated slot provided in a female attachment member attachable to the support,
the quick release mechanism includes locking means biased to engage when the head of the male attachment member is fully seated in the rebated slot in the female attachment member,
an actuator extends from the locking means for manual operation by a user, and
the actuator is a lever which extends beyond the periphery of the display device when mounted on the support.

2. A support for an electrical display device, comprising
mounting means configured to suspend the display device therefrom,
said mounting means including a quick release mechanism to allow the display device to be readily and quickly detached from the support, wherein
the support is an arm having mounting means at its end remote from the quick release mechanism for attaching to the support which is a support post,
said mounting means includes a pivot joint which allows the arm to move from side to side in a horizontal plane,
the mounting means is a collar or sleeve which fits over and around the support post, and
the collar is a tube open at both ends, the tube being of a constant internal diameter except at one end thereof which increases in internal diameter to provide an internal chamfered edge around said one end.

3. A support post for use with a display monitor support as claimed in claim 2 wherein the post has a plurality of parallel annular rebates spaced along its length to receive a resilient O-ring.

4. A support post as claimed in claim 3 wherein the post comprises a plurality of individual segments which interfit with each other.

5. Support apparatus comprising an arm having proximal and distal ends, first mounting means at said proximal end for mounting the arm on a fixed support, a universal joint at the distal end of the arm with a quick release mechanism connected thereto, the quick release mechanism comprising a male part with second mounting means thereon for attaching an article to be supported to the arm and a female part which releasably cooperates with the male part, said female part being connected to the universal joint.

6. Support apparatus as claimed in claim 5, wherein the quick release mechanism includes releasable locking means to retain the male and female parts together when engaged with each other.

7. Support apparatus as claimed in claim 5, wherein said arm includes a pivot joint intermediate its proximal and distal ends which allows the distal end of the arm to move from side to side in a horizontal plane.

8. Support apparatus as claimed in claim 5, wherein the first mounting means is a collar or sleeve which fits over and around a support post as the fixed support.

9. Support apparatus as claimed in claim 5, wherein the first mounting means includes attachment means operable to engage with a wall as the fixed support to attach the arm thereto.

10. Support apparatus as claimed in claim 5, wherein the male part of the quick release mechanism has a head protruding therefrom which is received in an open-ended slot provided in the female part.

11. Support apparatus as claimed in claim 5, wherein the quick release mechanism includes locking means biased to engage when said head is fully seated in said slot.

12. Support apparatus as claimed in claim 5, wherein said universal joint is structured and arranged to pivot about two axes normally arranged with respect to one another.

13. Support apparatus as claimed in claim 12, wherein said normal axes constitute respective horizontal and vertical axes.

14. Support apparatus as claimed in claim 12, wherein said universal joint (5) comprises a mounting plate (80), a spigot (82) extending from said mounting plate (80) and having an enlarged, disc-shaped head (83) with a central hole (84) extending therethrough normally to an axis of said spigot (82), a shell (70) enclosing said head (83) and comprising pivot pins (71, 72) extending from opposite ends thereof, with said plate (80) arranged to pivot up and down about an axis defined by the central hole (84) through the spigot head (83), and the arm (2A) comprising a Y-shaped yoke (61) at the distal end and defining two aligned bores (62, 63) at opposite ends of said yoke (61) from the arm (2A), with the pins (71, 72) structured and arranged to be seated in the respective bores (62, 63) to allow said plate (80) to also pivot from side to side about an axis defined by said pins (71, 72).

15. Support apparatus as claimed in claim 12, wherein said quick release mechanism is directly mounted upon the universal joint.

16. Support apparatus as claimed in claim 5, wherein said quick release mechanism is structured and arranged to attach and secure an article thereto and prevent detachment in coupled state, and release attachment of the article upon actuation of an actuator attached to said quick release mechanism.

17. Support apparatus as claimed in claim 12, wherein said quick release mechanism is structured and arranged to attach and secure an article thereto and prevent detachment in coupled state, and release attachment of the article upon actuation of an actuator attached to said quick release mechanism.

18. Support apparatus as claimed in claim 15, wherein said quick release mechanism is structured and arranged to attach and secure an article thereto and prevent detachment in coupled state, and release attachment of the article upon actuation of an actuator attached to said quick release mechanism.

19. Support apparatus comprising an arm having proximal and distal ends, first mounting means at said proximal end for mounting the arm on a fixed support, a universal joint at the distal end of the arm with a quick release mechanism connected thereto, the quick release mechanism comprising a male part with second mounting means thereon for attaching an article to be supported to the arm and a female part which releasably cooperates with the male part, said female part being connected to the universal joint, wherein the quick release mechanism includes releasable locking means to retain the male and female parts together when engaged with each other, and an actuator extends from the locking means for manual operation by a user to release said locking means.

20. Support apparatus as claimed in claim 19, wherein the actuator is a lever.

21. Support apparatus comprising an arm having proximal and distal ends, first mounting means at said proximal end for mounting the arm on a fixed support, a universal joint at the distal end of the arm with a quick release mechanism connected thereto, the quick release mechanism comprising a male part with second mounting means thereon for attaching an article to be supported to the arm and a female part which releasably cooperates with the male part, said female part being connected to the universal joint, wherein the first mounting means is a collar or sleeve which fits over and around a support post as the fixed support, and the collar is a tube open at both ends, the tube being of a constant internal diameter but one end thereof increasing in internal diameter to provide an internal chamfered edge around said one end.

22. A support post for use with a support apparatus as claimed in claim 21, wherein the post has a plurality of parallel annular rebates spaced along its length.

23. A support post as claimed in claim 22, wherein the post comprises a plurality of individual segments which interfit with each other.

24. A support post as claimed in claim 22, including a resilient O-ring located in one of said rebates.

25. A support post as claimed in claim 23, including a resilient O-ring located in one of said rebates.

* * * * *